US012589466B2

(12) United States Patent
Droeller et al.

(10) Patent No.: US 12,589,466 B2
(45) Date of Patent: Mar. 31, 2026

(54) SANDBLASTING MASK

(71) Applicant: SAFRAN AERO BOOSTERS, Herstal (BE)

(72) Inventors: Matthieu Edouard Henri Droeller, Herstal (BE); Michael Leon Josephe Trafalski, Herstal (BE); Kevin Francois Michel Malaise, Herstal (BE)

(73) Assignee: SAFRAN AERO BOOSTERS SA (BE)

( * ) Notice: Subject to any disclaimer, the term of this patent is extended or adjusted under 35 U.S.C. 154(b) by 0 days.

(21) Appl. No.: 18/262,427

(22) PCT Filed: Jan. 17, 2022

(86) PCT No.: PCT/EP2022/050838

§ 371 (c)(1),
(2) Date: Jul. 21, 2023

(87) PCT Pub. No.: WO2022/157097

PCT Pub. Date: Jul. 28, 2022

(65) Prior Publication Data

US 2024/0075586 A1 Mar. 7, 2024

(30) Foreign Application Priority Data

Jan. 21, 2021 (BE) .................................. 2021/5038

(51) Int. Cl.
*B24C 1/04* (2006.01)
*B24C 3/32* (2006.01)
*F01D 5/12* (2006.01)

(52) U.S. Cl.
CPC .................. *B24C 1/04* (2013.01); *B24C 3/32* (2013.01); *F01D 5/12* (2013.01); *F05D 2230/10* (2013.01); *F05D 2240/307* (2013.01)

(58) Field of Classification Search
CPC .. B24C 1/04; B24C 1/10; B24C 1/086; B24C 3/22; B05B 12/20; B05B 12/24; C23C 14/042
See application file for complete search history.

(56) References Cited

U.S. PATENT DOCUMENTS 3,702,496 A * 11/1972 Stevens .................. B29C 69/00 451/442
5,998,755 A 12/1999 Zajchowski
(Continued)

FOREIGN PATENT DOCUMENTS

FR 2962357 1/2012

OTHER PUBLICATIONS

Dunn, Dave. "Ask Dr. Dave: What is the difference between a polyurethane adhesive and a polyurea adhesive". Sep. 2, 2014. ASI Adhesives & Sealants. <https://www.adhesivesmag.com/articles/93229-ask-dr-dave-what-is-the-difference-between-a-polyurethane-adhesive-and-a-polyurea-adhesive>. (Year: 2014).*
(Continued)

*Primary Examiner* — Joel D Crandall
(74) *Attorney, Agent, or Firm* — Emerson, Thomson & Bennett, LLC; Roger D. Emerson; Peter R. Detorre

(57) ABSTRACT

The invention relates to a sandblasting mask (50) as well as its use for the sandblasting of blade tips in a method comprising a step of positioning a plurality of sandblasting masks (50), each blade passing through an opening (58) of a mask and each blade tip extending projecting from the respective mask, the masks being assembled two by two preferably without play; and a step of sandblasting the protruding blade tips of the masks.
The masks (50) are preferably produced by plastic additive manufacturing and coated with a polyurea-based coating.

13 Claims, 2 Drawing Sheets

(56) References Cited

U.S. PATENT DOCUMENTS

| | | | | |
|---|---|---|---|---|
| 6,037,004 | A * | 3/2000 | Zajchowski | B05B 12/20<br>427/292 |
| 8,858,167 | B2 | 10/2014 | Baumann | |
| 2008/0199628 | A1 * | 8/2008 | Markowski | B05B 12/24<br>118/721 |
| 2014/0003951 | A1 * | 1/2014 | Soucy | F01D 5/34<br>451/29 |
| 2015/0231665 | A1 * | 8/2015 | Strock | B05B 12/20<br>427/282 |
| 2015/0368786 | A1 | 12/2015 | Tryon | |
| 2018/0106154 | A1 * | 4/2018 | Baldwin | F01D 5/288 |
| 2020/0238381 | A1 * | 7/2020 | Shi | B33Y 50/00 |

OTHER PUBLICATIONS

International Search Report for corresponding International Application No. PCT/EP2022/050838, issued Apr. 7, 2022.

* cited by examiner

SANDBLASTING MASK

DOMAIN

The invention relates to the field of sandblasting operations for aeronautical parts and in particular the sandblasting of turbomachine compressor blade tips.

PRIOR ART

The compressor blades are formed of a profiled blade which guides the air flow in the turbomachine. Depending on its position in the turbine engine and its function, this blade is assembled to an attachment platform, to a hub, to a shroud or to fixed casing elements. This assembly requires the bonding of a ferrule on the free end of the blades which requires preparation of the surface to be bonded in particular by sandblasting.

As the blade is manufactured with tight tolerances to guide the airflow precisely, it should be protected from sand so that only the blade tips are sanded.

The usual practice aims to position a sandblasting mask revealing the blade tips and covering the parts to be protected. To this end, a metal profile weighing approximately 2 to 5 kg and measuring approximately 5 meters is used to sandblast several dozen blades in a single operation. The mask can be a ribbon which is bent over itself to form a hoop, in order to sand the blades already arranged in an annular row and of which one of the respective ends of each blade is fixed to a hub or a casing, the other end to be sandblasted.

Due to its size and its weight, this mask is dangerous to handle, both for the operator and for the parts of the turbomachine that it risks hitting and damaging during its handling. Also, its implementation in the form of a strapping creates a gap between the two ends placed vis-à-vis. This gap can be significant and must be covered with an adhesive tape or a silicone joint before the sanding operation so as not to affect the surfaces which should not be sanded. This mask also needs to be held in place by external means (a holding structure) during the sandblasting operation.

SUMMARY OF THE INVENTION

The invention aims to overcome at least one of the drawbacks of the prior art, in particular by proposing a sandblasting mask and a corresponding method of use, which improve the safety of operators and equipment, and/or which do not require gap covering operation before sandblasting.

The subject of the invention is a method for sandblasting blade tips comprising: a step of placing a plurality of sandblasting masks, each mask comprising a body having a row of openings, the masks being positioned such so that each blade passes through an opening in a mask and each blade tip extends projecting from the respective mask, the masks being assembled in pairs, preferably without play; and a step of sandblasting the protruding blade tips of the masks.

A method of this type allows the use of masks without danger when handling them and limits the play between the masks.

According to an advantageous embodiment of the invention, the bodies of the masks are made of plastic material and produced by 3D printing, then optionally covered with a polyurea-based coating. The use of plastic reduces the weight and thus facilitates the handling and storage of the masks. An example of the type of plastics that can be used in this context is PC-ABS (mixture of polycarbonate and acrylonitrile butadiene styrene). The coated plastic body helps maximize durability without penalizing the manufacturing cost of the mask. The coating is particularly resistant to the abrasiveness of sand. The coating thus protects the body of the mask and if necessary the coating is recharged/replaced without requiring the replacement of the mask (sacrificial coating).

According to an advantageous embodiment of the invention, the step of positioning the masks is preceded by a step during which the blades are arranged substantially radially in an annular row, the masks describing, once assembled, a circle or an arc of a circle of curvilinear length preferably between 3 and 8 meters, more preferably close to 5 meters.

According to an advantageous embodiment of the invention, the installation of the blades in an annular row is carried out by assembling the blades to a compressor casing, to an outer shroud or to an inner shroud; and after the sandblasting step, an inner or outer shroud is assembled to the sandblasted blade tips.

According to an advantageous embodiment of the invention, the method further comprises a step of monitoring the quality of the masks and in particular the thickness of the coating, and an insufficient quality or a coating thickness below a threshold leads to the reloading of the covering or the replacement of the mask.

According to an advantageous embodiment of the invention, once assembled, the masks form a self-supporting structure. It thus becomes unnecessary to provide external supports for the masks.

According to an advantageous embodiment of the invention, the step of positioning the masks comprises the positioning of 3 to 10 masks, preferentially the positioning of 4 or 6 masks. It is understood that the number of masks can be chosen according to their dimensions, the perimeter to be scanned and/or the number of blades to be sandblasted.

According to an advantageous embodiment of the invention, the masks are positioned such that the blade tips protrude from the mask by a length of between 5 and 15 mm, preferably between 7 and 13 mm.

The invention also relates to a sandblasting mask for such a process, the mask comprising a body having a row of openings intended to receive respective portions of turbomachine compressor blades, the body being essentially formed of plastic material produced by 3D printed and at least partially covered with a polyurea-based coating. This sacrificial coating is particularly resistant to the abrasiveness of sand. The coating thus protects the body of the mask and if necessary the coating is recharged/replaced without requiring the replacement of the mask.

According to an advantageous embodiment of the invention, the mask is in the main form of a profile and it is provided with lugs projecting from the profile at each of its ends, the lugs being intended for the assembly of the mask to another identical mask. Such a design allows easier manufacture and assembly requiring no special tools.

According to an advantageous embodiment of the invention, the ends of the mask are intended to be assembled at the respective ends of one or two other identical masks without play. The absence of play makes it possible to ensure that no surface to be protected is exposed to sand.

According to an advantageous embodiment of the invention, the mask extends over a length of between 80 and 130 cm.

According to an advantageous embodiment of the invention, the mask weighs between 500 and 1000 grams, preferably between 600 and 700 grams. This allows easy handling and storage.

According to an advantageous embodiment of the invention, the mask has a male end and a female end. These male/female ends can thus form a corrector making the assembly of the masks efficient and reliable.

According to an advantageous embodiment of the invention, comprises a second row of openings. This allows the sandblasting of several rows of blades, in particular in a compressor comprising two rows of stator blades or two rows of directly successive rotor blades.

The invention also relates to a kit comprising a plurality of masks according to one of the embodiments described above, the kit comprising at least two masks having distinct lengths.

This kit makes it possible to cover a set of blades with more flexibility of use, the small mask(s) can be placed in the places most subject to wear (for example supporting the most mechanical stresses), in order to judiciously anticipate replacement of small parts at lower cost.

DETAILED DESCRIPTION OF THE DRAWINGS

In the following description, the terms "internal" and "external" refer to positioning relative to the axis of rotation of a turbomachine. The axial direction corresponds to the direction along the axis of rotation of the turbomachine. The radial direction is perpendicular to the axis of rotation. The tangential direction is perpendicular to the axial and radial directions. Upstream and downstream refer to the main flow direction of the stream in the turbomachine.

The figures are not shown to scale. In particular, the thicknesses are enlarged to facilitate the reading of the figures.

Figure 1:
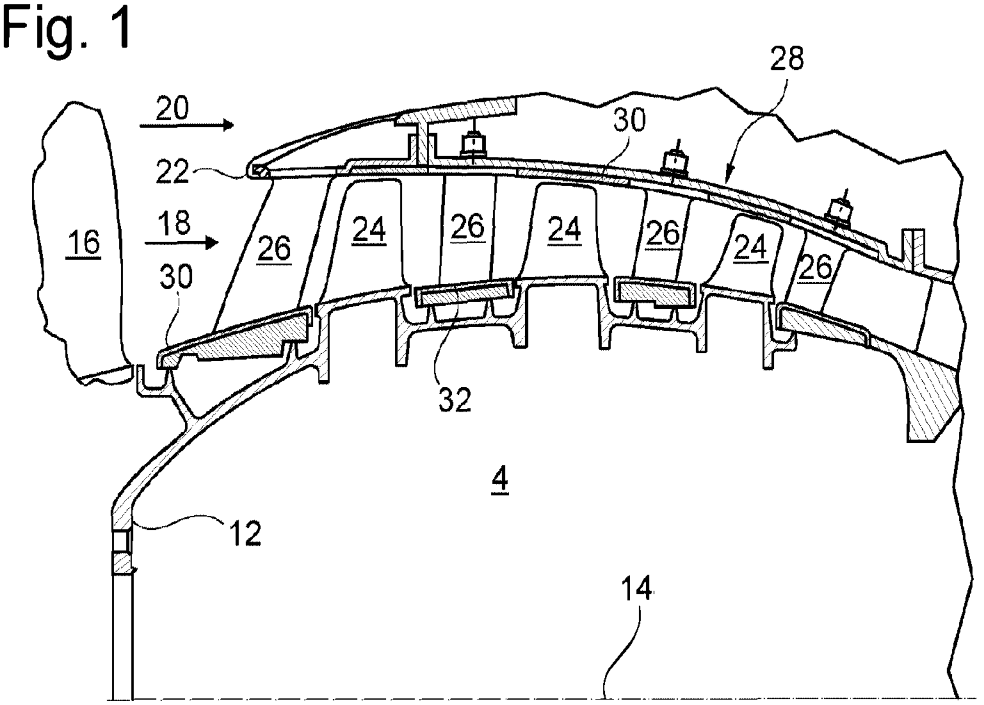
FIG. 1 illustrates a schematic sectional view of a turbomachine compressor.

FIG. 1 schematically represents a compressor 4 of a turbomachine. This is a low-pressure compressor here, but the teachings of the present application can also be applied to a high-pressure compressor or to a turbine.

The compressor 4 comprises a rotor 12 which rotates around an axis 14 and which is coupled to a fan 16. The fan 16 generates an air flow which is divided into a primary flow 18 and a secondary flow 20 at the nozzle 22. The compressor 4 comprises several rows of rotor blades 24 and several rows of stator blades 26.

Compressor 4 includes a housing 28. Housing 28 may have a generally circular or tubular shape. It can be composed of several angular segments or be one-piece. It may be made of composite material.

Blades 24, 26 extend essentially radially. In the example illustrated, the blades 24 are in one piece with a drum 25 to form the rotor 12. Alternatively, they can have a platform for fixing to a drum or be welded/glued to a rotating shroud. The rotor 12 can thus be made of several moving wheels, each carrying an annular row of rotor blades 24.

The outer radial end of the blades 24 comes opposite the casing 28. In the example illustrated, a layer of abradable material 30 is arranged in line with the outer radial end of the blades 24.

The stator blades 26 can be fixed to an inner shroud 32 and to the casing 28. The invention will be detailed for stator blades 26 but it is understood that the teachings described for the inner ends (or tips) of the stator blades 26 can also apply to their outer ends or to the rotor blades.

Figure 2:
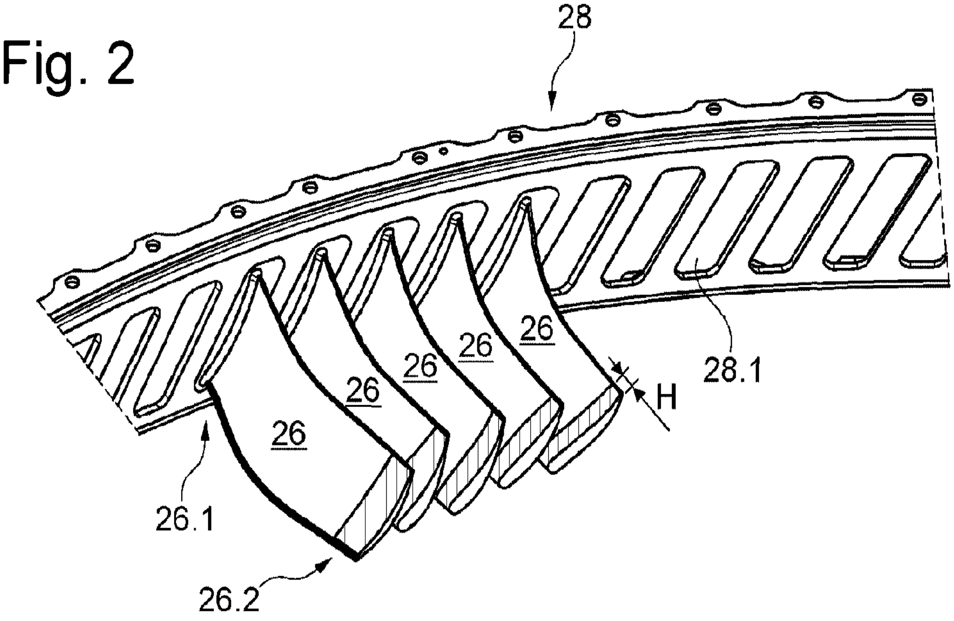
FIGS. 2 and 3 illustrate a partial view of a compressor stage being assembled.

FIG. 2 illustrates a partial view of a compressor stage during an intermediate stage in the assembly of the compressor, in which the blades 26 are fixed at their outer end 26.1 to the casing 28. They may for example have been inserted at the across slots 28.1 of housing 28.

The inner end 26.2 is free. It is ready to be sandblasted before welding or gluing to the ferrule (32 in FIG. 1), for example over a radial length "H" which can be between 5 and 15 mm, preferably between 7 and 13 mm.

Once again, the invention is not limited to the sandblasting of the internal ends of the stator blades but at any end (internal or external) of any type of blade (stator, rotor, compressor, turbine or fan).

Figure 3:
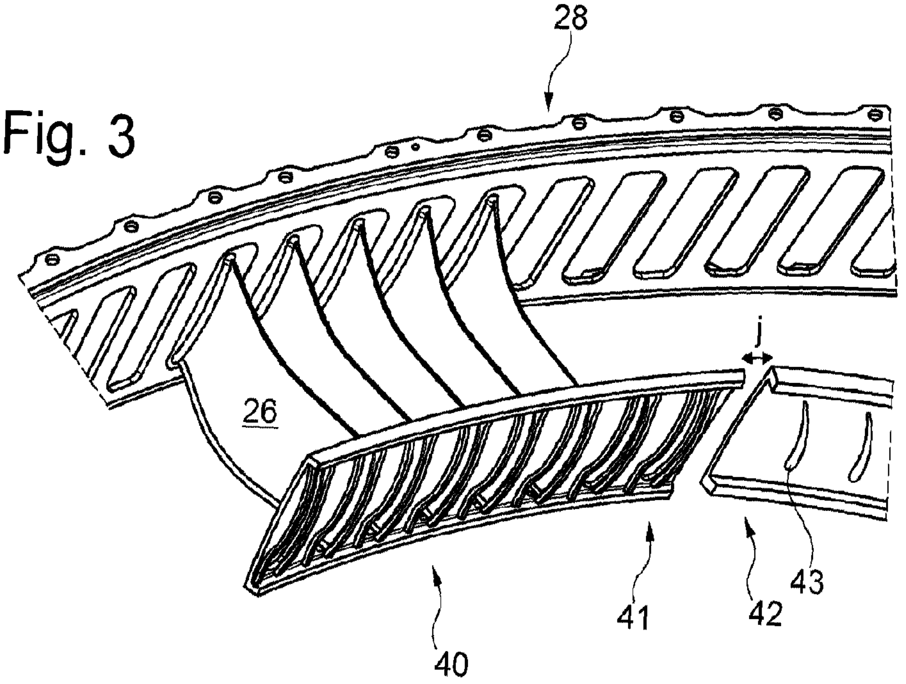

FIG. 3 shows the next assembly step during which a conventional sandblasting mask 40 has been positioned at the inner ends 26.2 of the blades. The mask 40 is shown here with a U-shaped section profile. It is made of steel and has a length of approximately 5 meters, from one end 41 to the other 42. Openings 43 are arranged to allow the passage of a portion of each dawn. The mask 40 is flexible and can be bent back on itself to form a strapping.

FIG. 3 thus shows the two ends 41 and 42 of the mask, which are separated from each other by a clearance "j" of a few millimeters. It is difficult to obtain zero play and an overlapping of the ends is not desirable: the tips of the blades would be obstructed and would remain unsanded, or difficulties in sliding the blades into the openings of the mask would appear. This gap must be filled to avoid damaging surfaces that you do not want them to be sanded.

Figure 4:
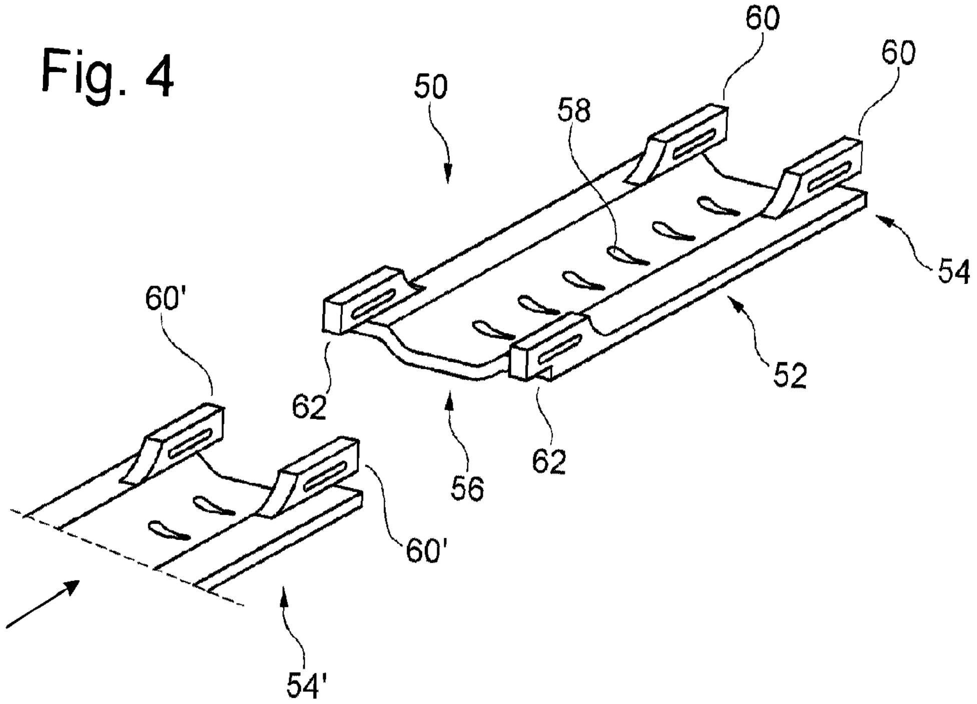
FIG. 4 describes a sandblasting mask according to the invention.

FIG. 4 shows a mask 50 according to the invention. This can be distinguished from the mask known from the prior art by at least one of the following properties: its geometry, its scale factor, its constituent material, its weight, its physical or surface properties, its coating.

In the example illustrated, the mask 50 of the invention comprises a body 52 which extends from one end 54 to another 56. The ends 54, 56 are of distinct designs and can be described as male and female. They aim at the assembly without play of two identical masks. The term "identical" is used here to describe, by misuse of language, masks which are capable of being assembled together, without this limiting them in terms of length, number of openings or construction.

The body 52 may have the shape of a particularly concave profile in the form of a gutter. It is pierced with one (or more) row(s) of openings 58 intended to be traversed by the blades. The openings 58 have a shape close to the profile of the blades (intrados and extrados).

The mask 50 can be equipped at its ends 54, 56 with tabs 60, 62 projecting from the profile. The legs 62 of one end 56 are adapted to be assembled with the legs 60' of the other end 54' of another mask (and vice versa). For example, fasteners passing through oblong holes in each of the lugs can be provided.

Several masks 50 are thus butted together in pairs to form a strapping protecting all of the blades of an annular row of blades.

In the example illustrated, the tabs 60 are closer together than the tabs 62. The end 56 can thus be considered as a female end.

It goes without saying that many variations are possible for the position, orientation or size of each of the legs. Other assembly means are also possible, in particular clipping tabs, rapid assembly means (pin, bayonet, etc.).

The geometry of the ends 54, 56 is such that when the masks are in position, no play appears and the sand does not cross any gap between the masks.

The mask 50 is at least partially covered with a polyurea-based coating. The deposition of the coating can be done in one or more layers, for example applied by spraying with a spray gun. Coating is provided at least on surfaces exposed to sandblasting. The thickness of the coating can be between 0.1 and 4 mm, preferentially between 0.5 and 3 mm, and in particular approximately 2 mm.

The mask 50 can be flexible enough to be manipulated by hand with ease by operators when inserting the blades into the apertures or openings.

The invention claimed is:

1. A method for sandblasting blade tips comprising:

a step of positioning a plurality of sandblasting masks, each sandblasting mask comprising a body having a row of openings, the sandblasting masks being positioned such that each blade passes through an opening of one of the plurality of sandblasting masks and each blade tip extends projecting from the respective sandblasting mask, the sandblasting masks being assembled sequentially end-to-end and in pairs, with each pair having mating ends that are geometrically configured to eliminate play between the masks, in such a manner that the assembled plurality of sandblasting masks comprises an even number of sandblasting masks grouped in pairs; and a step of sandblasting the blade tips projecting from the sandblasting masks.

2. The method according to claim 1, wherein the bodies of the sandblasting masks are made of plastic material and produced by 3D printing.

3. The method according to claim 2, wherein the bodies of the sandblasting masks are covered with a polyurea-based coating.

4. The method according to claim 1, wherein the step of positioning the sandblasting masks is preceded by a step during which the blades are arranged substantially radially in an annular row, the sandblasting masks describing, once assembled, a circle or an arc of a circle of curvilinear length comprised between 3 and 8 meters.

5. The method according to claim 4, wherein the step during which the blades are arranged in an annular row is carried out by assembly of the blades to a casing of the compressor and to either an outer shroud or an inner shroud; and after the sandblasting step, an inner or outer shroud is fixed to the sandblasted blade tips.

6. The method according to claim 1, wherein once assembled, the sandblasting masks form a self-supporting structure that retains its shape without requiring external mechanical support during the sandblasting step.

7. The method according to claim 1, wherein the step of positioning the sandblasting masks comprises positioning of 3 to 10 sandblasting masks.

8. The method according to claim 1, wherein the sandblasting masks are positioned such that the blade tips project from the sandblasting mask by a length comprises between 5 and 15 mm.

9. A sandblasting mask comprising a body having a row of openings dimensioned to receive respective portions of turbomachine compressor blades, the body being formed of plastic material produced by 3D printing and at least partially covered with a polyurea-based coating, said body further comprising opposite ends provided with mating features geometrically configured, upon assembly to ends of at least one identical mask, to eliminate play between adjacent masks so as to form a continuous masking structure.

10. The sandblasting mask according to claim 9, wherein said sandblasting mask is in the main form of a profile and is provided with tabs projecting from the profile at each of its ends, the tabs being intended for the assembly of the sandblasting mask to another identical sandblasting mask.

11. The sandblasting mask according to claim 9, wherein said sandblasting mask extends over a length comprised between 80 and 130 cm.

12. The sandblasting mask according to claim 9, wherein said sandblasting mask weighs between 500 and 1000 grams.

13. The sandblasting mask according to claim 9, wherein one end is male and the opposite end is female, the male end being dimensioned to interlock with the female end of an identical mask to eliminate play.

* * * * *